Aug. 6, 1946.  H. B. HOLTHOUSE  2,405,145
HEATING SYSTEM
Filed April 19, 1943  5 Sheets-Sheet 1

Inventor:
Harry B. Holthouse
By- Laorman L. Muelle
Atty.

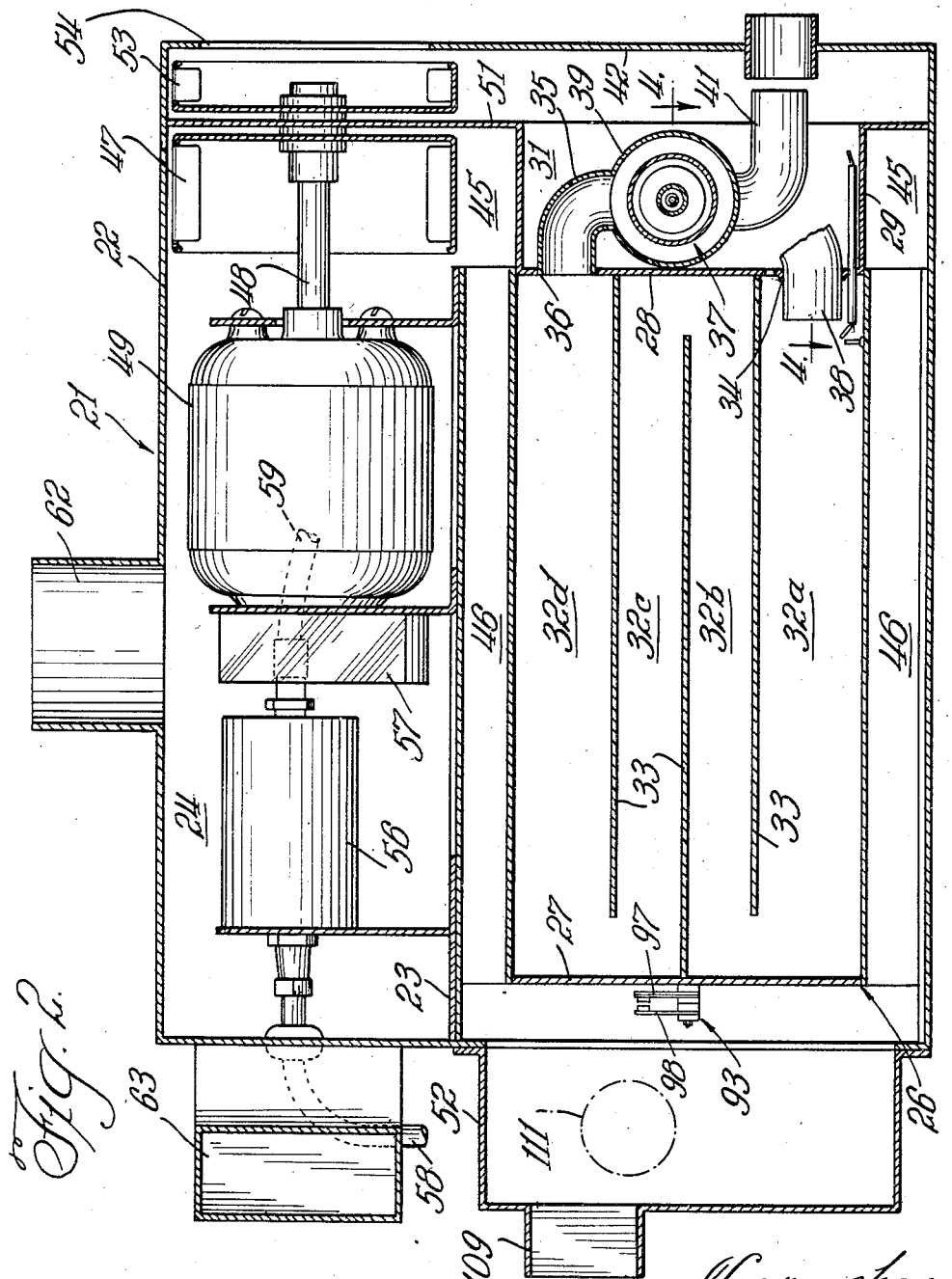

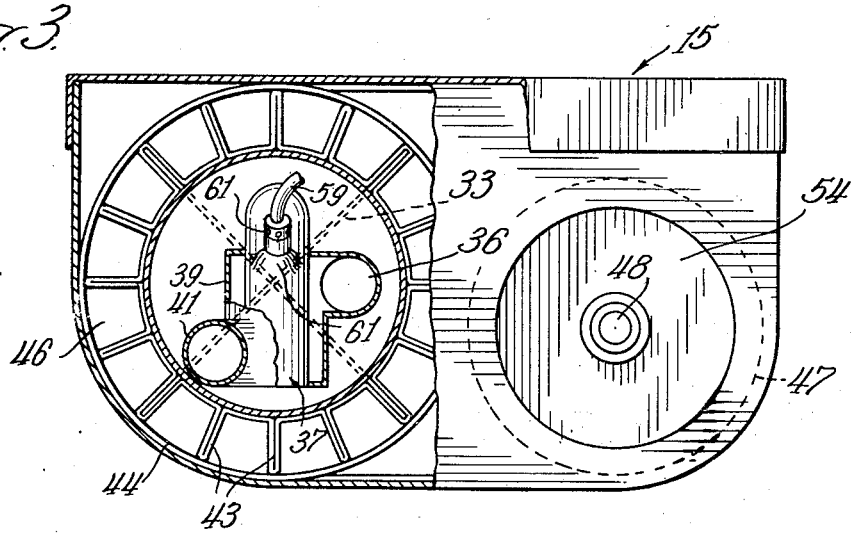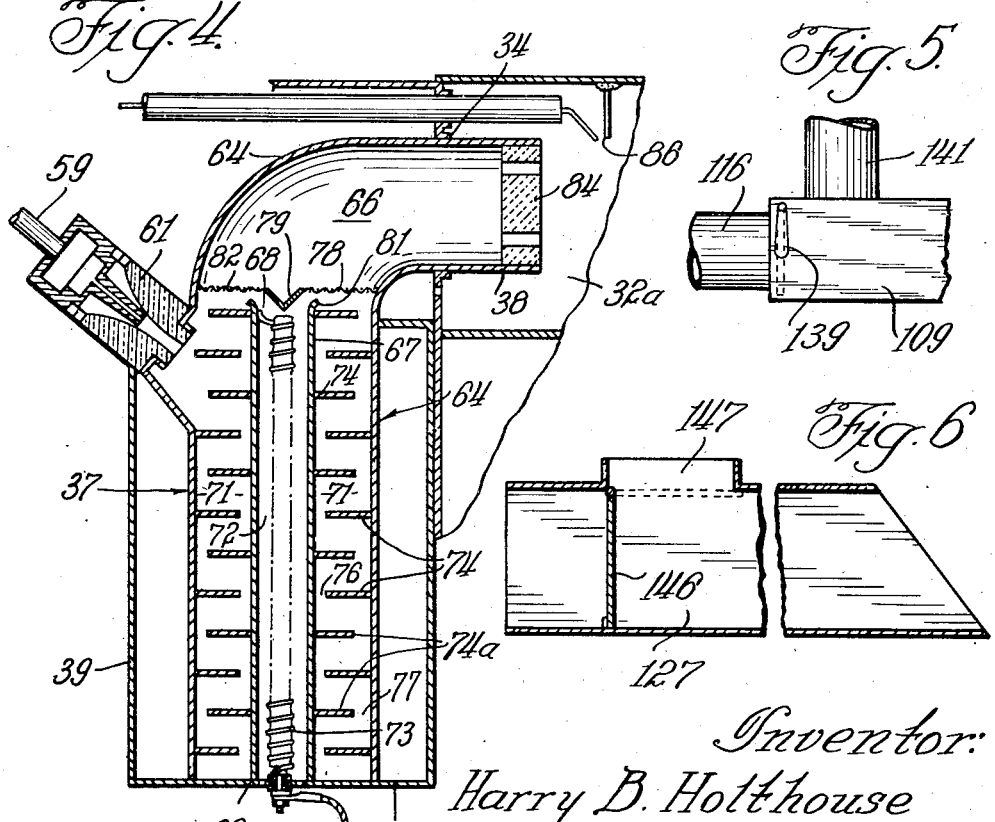

Aug. 6, 1946.  H. B. HOLTHOUSE  2,405,145
HEATING SYSTEM
Filed April 19, 1943  5 Sheets-Sheet 4

Inventor:
Harry B. Holthouse
By: Foorman L. Mueller
Atty.

Aug. 6, 1946.  H. B. HOLTHOUSE  2,405,145
HEATING SYSTEM
Filed April 19, 1943  5 Sheets—Sheet 5
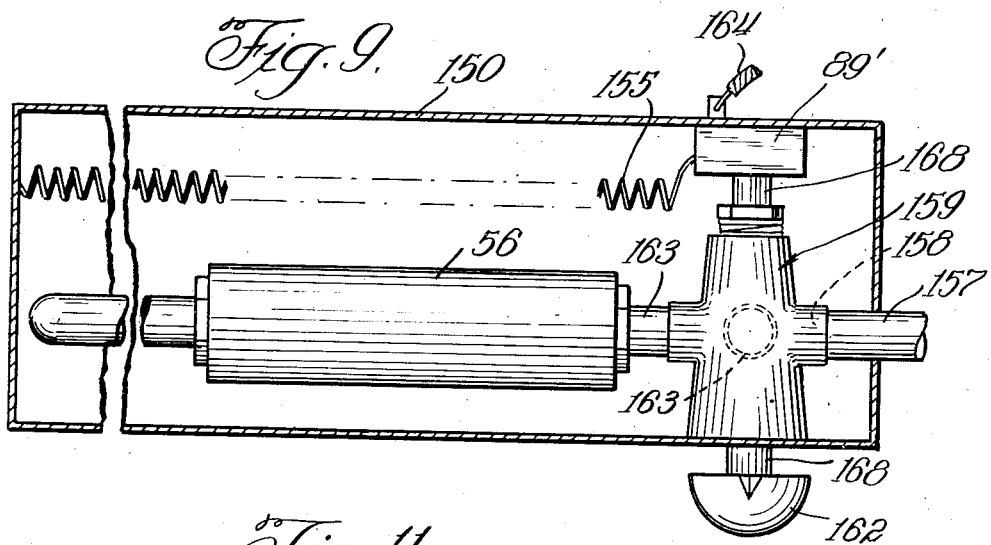
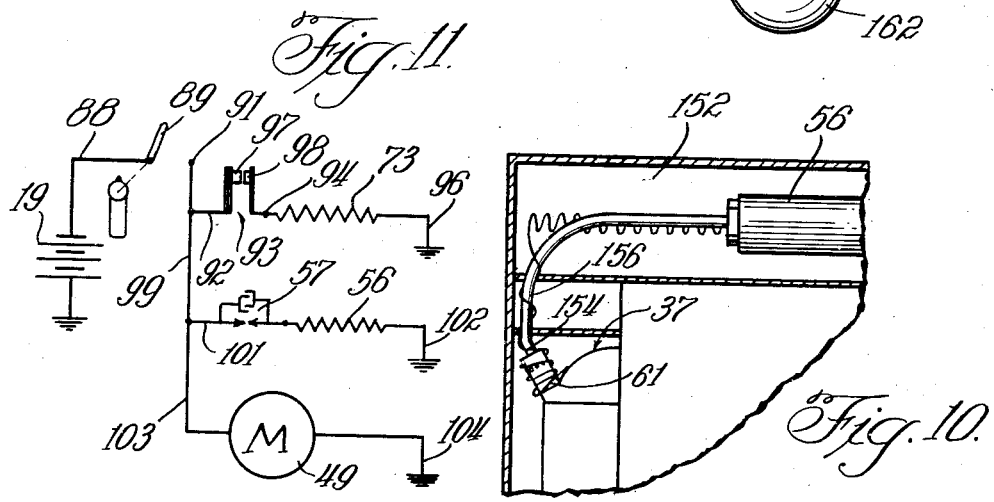
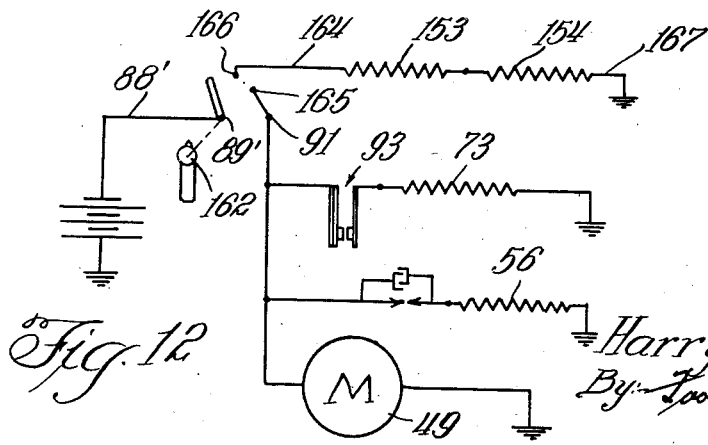
Inventor
Harry B. Holthouse
By Foorman L. Mueller
Atty.

Patented Aug. 6, 1946

2,405,145

UNITED STATES PATENT OFFICE 2,405,145

HEATING SYSTEM

Harry B. Holthouse, Chicago, Ill., assignor to Galvin Manufacturing Corporation, Chicago, Ill., a corporation of Illinois Application April 19, 1943, Serial No. 483,634

8 Claims. (Cl. 123—142.5)

This invention relates generally to heating systems for facilitating the starting, at cold temperatures, of power units of combustion type having a battery for starting and operating purposes and in particular to such a heating system providing for the starting of a power unit of Diesel type.

Considerable difficulty is generally encountered in starting engines of combustion type from an associated storage battery at cold temperatures due to the reduced effective capacity of the battery with cold temperatures. Thus a fully charged battery retains its maximum effective capacity down to a temperature of about 30° F., but at temperatures below this value, and in the neighborhood of —20° F., the effective capacity is appreciably reduced by virtue of the increased internal resistance of the battery. Concurrently with a decrease in the effective capacity of the battery there is an increase in the power required to turn over the engine at a cranking speed due to the oil in the engine and the engine starting motor becoming stiff or less viscous. As a result a battery capable of efficiently starting an engine at a temperature of 30° F., is often incapable of starting and at times of even turning over an engine, at a temperature below zero. It is apparent, of course, that any fuel priming of the engine or heating of certain engine parts are of little value in starting the engine when the engine cannot be turned over or cranked at a suitable starting speed.

In engines of Diesel type further starting difficulties arise due to the tendency of the usual Diesel engine fuel oil becoming thick at cold temperatures. Thus at temperatures in the neighborhood of —30° F., and lower many of these fuel oils are so thick as to be incapable of flowing freely. As a result it is practically impossible to operate the fuel system and to properly prepare the fuel for burning in the engine by the usual fuel injecting process.

It is an object of this invention, therefore, to provide an improved system for heating a power unit of combustion type at cold temperatures to prepare the unit for positive starting.

Another object of this invention is to provide an improved system, for heating a Diesel engine and its associated starting battery and fuel supply system, for engine starting at cold temperatures, which uses the starting battery as a sole source of power supply.

A further object of this invention is to provide a system for heating a Diesel engine and an associated starting battery and fuel supply system to condition the engine for starting at cold temperatures, which system includes a heater of combustion type adapted for compact assembly with the engine, capable of being operated from the battery as the sole source of power supply when the effective capacity of the battery is at a reduced value, and adapted to burn the same fuel used in the operation of the Diesel engine.

Yet another object of this invention is to provide a heater of combustion type having improved means for preparing a liquid fuel for burning therein.

A feature of this invention is found in the provision of a system for heating a power unit of combustion type for starting purposes in which the hot exhaust gases from a battery-operated air heater of combustion type are used to heat the fuel supply, and the heated air to heat the engine and the fuel feeding system.

Another feature of this invention is found in the provision of a burner of combustion type in which means for preparing a liquid fuel for burning is of a construction to utilize the heat from the burner exhaust gases to heat the fuel.

Further objects, features and advantages of this invention will become apparent from the following description when taken in connection with the accompanying drawings in which;

Fig. 2 is a longitudinal sectional view of the heating unit used in the heating system of this invention, with the combustion portion of the heater unit being shown in development for the purpose of clarity;

Fig. 3 is an elevational end view of the heating unit looking toward the left as viewed in Fig. 2, with portions being removed to more clearly illustrate the construction and relative assembly of the combustion chamber and the liquid fuel preparing apparatus;

Fig. 4 is a sectional view of the liquid fuel preparing apparatus as taken along approximately the line 4—4 in Fig. 2;

Fig. 5 is a fragmentary detail view of the valve means used in the distribution of the heat from the heating unit shown in Fig. 2;

Fig. 6 is a detail view of a valve means for controlling the return of heated air from the engine compartment of the automobile to the heating unit shown in Fig. 2;

Fig. 9 is an enlarged sectional plan view of the fuel supply for the heating unit as seen along the lines 9—9 in Fig. 8;

Fig. 10 is a fragmentary detail view showing electrical resistance means for preheating the fuel feeding system of the heating unit in Fig. 8;

Fig. 11 illustrates diagrammatically a control circuit applicable to the embodiment of the invention shown in Fig. 1; and Fig. 12 illustrates diagrammatically a control circuit for the modified form of the invention shown in Fig. 8.

Figure 1:
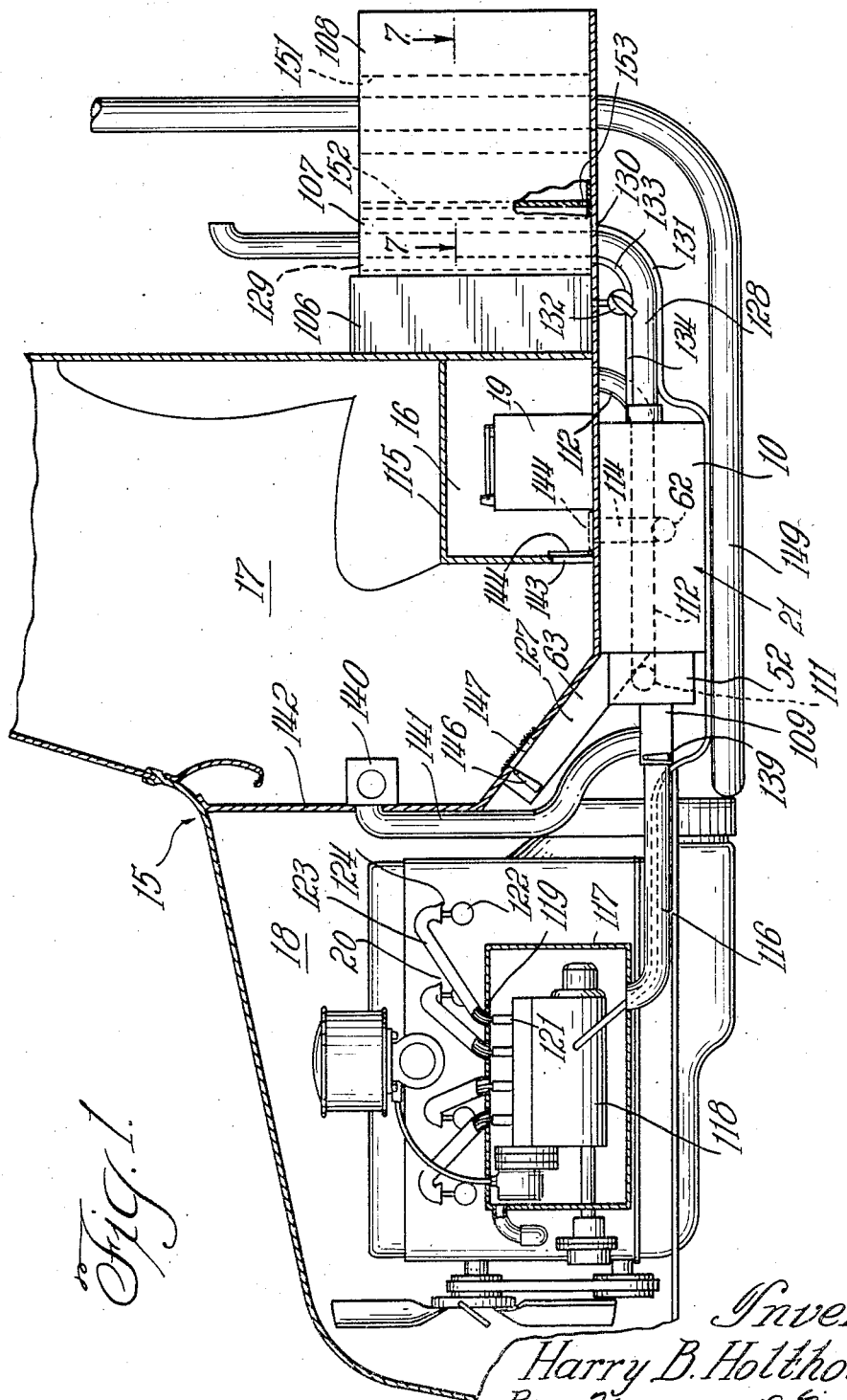
Fig. 1 is a fragmentary sectional view of an automobile body showing the relative assembly therein of the heating system of this invention.

The heating system of this invention is illustrated in the drawings as applied to a mobile craft having a Diesel engine as a motive power and includes a heating unit of combustion type which uses a starting battery for the Diesel engine as a sole source of power supply, and is capable of burning the same fuel that is used in the operation of the Diesel engine. Included as a part of the heating unit or heater is an electrically driven fan for moving air in a heat exchange relation with the combustion chamber of the heater. This heated air is directed to the engine battery and to the injector units, fuel pump and connecting lines of the fuel feeding system to heat the fuel in these parts concurrently with the heating of the battery. Further air heated by the heating unit may be selectively distributed into the engine compartment or directly into the engine crank case. In order to accomplish a complete heating of the fuel feeding system and the source of fuel supply the exhaust gases discharged from the combustion chamber of the heater are passed in a heat exchange relation with the fuel tank from which fuel is supplied to the engine.

The electrically operated portions of the heater including the electrically operated fan are capable of being operated from the starting battery when the effective capacity of such battery is reduced at cold temperatures, so that the heater may be operated independently of the engine and for a period sufficient to heat the engine without in the meantime impairing the ability of the battery to later turn over the engine. After the engine is in operation the air heated by the heater is selectively directed to the passenger compartment of the mobile craft and to the battery, while the engine exhaust gases are used to supplement the heating of the engine fuel tank by the exhaust gases from the heater. The heating system thus provides for a complete heating of the engine, the engine fuel feeding system, the engine starting battery and the source of supply of engine fuel to an optimum temperature which provides for the starting of the engine under substantially normal conditions.

The batteries generally used for trucks are rated at about 12 volts. In the testing of batteries the amperage drain and the resultant voltage at various temperature values are usually recorded at the battery terminals while the battery is shorted. The results thus obtained are not entirely accurate in indicating the effective capacity of the battery for engine starting purposes, since the circuit for the engine starting motor may require an amperage drain which greatly decreases the indicated amperage reading at the battery terminals, so that the indicated amperage reading at the battery terminals does not give the true value of the amperage drain for starting. Thus a 12 volt battery in a fully charged condition, is capable at about 30° F., to carry a drain of about 425 amperes while maintaining a voltage of about 10 volts. However, this voltage is greatly reduced when the battery is cold so that the same at −10° F., and with a corresponding amperage drain of 425 amperes will have a voltage of about 9 volts, the drop in voltage being due to the increase in internal resistance of the battery at cold temperatures. At a temperature of −30° F., with the same amperage drain of 425 amperes the voltage decreases further to a value in the neighborhood of 7 volts. Under actual engine starting conditions, however, this voltage will be further decreased because of the additional amperage drain imposed on the battery due to the stiffness of the starting motor and the engine. Thus when requirements on the battery are most severe the battery is in a weakened condition and unable to handle the loads which it is designed to carry.

It is apparent, of course, that if the amperage drain on the battery even at cold temperatures is relatively small, for example about twenty amperes, the voltage at which such current is delivered will be relatively high so as to readily operate apparatus requiring twenty amperes. Thus at −30° F., a drain of twenty amperes on a 12 volt battery will reduce this voltage by a very small amount to about 11.6 volts. This amperage drain can be maintained for an appreciable period of time without impairing the effective capacity of the battery or in other words running down the battery to a point where it could not carry this load. With such a small drain imposed on the battery at −30° F. a continuous drain on the battery of twenty amperes, while it is being heated to about 30° F., would not appreciably affect its effective capacity at 30° F. Thus a fully charged battery at 30° F. cooled to a temperature of about −30° F. and then having a drain of twenty amperes imposed thereon for a period required in increasing its temperature back to 30° F., will have an effective capacity when returned to 30° F. which is not appreciably below the value of its effective capacity before it was cooled. The battery is thus able to deliver substantially its maximum capacity after being heated to 30° F.

In the present invention there is provided a battery-operated air heater which requires a maximum drain of about twenty amperes for starting operation, and then a drain of about eight and one-half amperes for normal continuous operation. The heated air from the heater is carried to the vehicle battery to heat the same to a temperature at which its effective capacity is capable of turning over the vehicle engine. Since the heater drain is relatively low the effective capacity of the battery when finally heated is at substantially a maximum value. As a result the battery will operate to turn over the engine with warm temperature efficiency.

With reference to the drawings the heating system of this invention is shown in Fig. 1 as applied to a mobile craft having a body 15 including a battery compartment 16, a passenger or operator's compartment 17 and an engine compartment 18. An engine starting battery 19 in the compartment 16 is of a usual storage type and is associated with an engine 20 located in the engine compartment. A heater of internal combustion type operated entirely by the battery 19, and indicated generally as 21, is included as a part of the heating system.

The heating unit 21 (Figs. 2 and 3) includes a housing 22 which is divided longitudinally over substantially its entire length by a vertically extending partition member 23 to form a mechanical compartment 24 and a heating compartment for a combustion chamber 26. The combustion chamber 26, which is shown in development in Fig. 2 for the purpose of clarity, is closed at one end by a cover plate 27 and at its opposite end by the bottom 28 of a substantially cup-shaped member 29 which defines in part an air supply chamber 31 in axial alignment with the combustion chamber 26. A partition member 33 of substantially X-shape divides the combustion chamber 26 longitudinally into four axially extending but connected passages 32a—32d. An inlet 34 and an outlet 36 for the combustion chamber are formed in the bottom 28 of the cup-shaped member 29 in communication with the passages 32a and 32d, respectively. A liquid fuel preparing apparatus, indicated generally as 37, which operates to prepare a liquid fuel for burning in the combustion chamber 26, is located in the air supply chamber 31 and has an outlet portion 38 positioned within the combustion chamber inlet 34. The combustion chamber outlet 36 is connected through a pipe 35 with a sleeve or jacket member 39 positioned about a portion of the fuel preparing apparatus 37, and is discharged from the sleeve member 39 into a tail pipe assembly 41 which carries the exhaust gases outwardly from the heater at the housing end 42.

The outer wall or body portion of the combustion chamber 26 carries angularly spaced axially extending fins 43. The fins 43 have a sleeve 44 positioned about their outer ends to form annular passages 46 about the combustion chamber 26 for air to be heated. The air to be heated is admitted into the passages 46 through an annular chamber 45, connecting these passages with the mechanical compartment 24, and is circulated about the combustion chamber through the passages 46 by a fan 47 located within the compartment 24 and mounted on a shaft 48 of an electrical motor 49. The compartment 24, chamber 45 and passages 46 are separated from the air supply chamber 31 by a partition member 51 extended transversely of the housing 21. From Fig. 2 it is seen that the air supply chamber 31 is defined by the cup-shaped member 29, partition member 51 and the end 42 of the housing 21. Air circulated by the fan 47 is thus confined to travel within the compartment 24 and through the passages 46 from where it is discharged into a manifold 52 for distribution to desired places as will be later described.

The air supply chamber 31 receives air from a fan 53 carried on the motor shaft 48 which is journalled in the partition member 51, with an inlet 54 for the fin 53 being formed in the housing end 42. The motor 49 is also used in the operation of a fuel pump 56 which is illustrated as being of a solenoid type. A breaker assembly 57 for controlling the energization of the pump 56 is operatively associated with the motor shaft 48. Fuel for the pump 56 is supplied from a suitable source, through a pipe 58 and is delivered through a pipe 59 to a fuel injection nozzle 61 (Figs. 3 and 4) formed as a part of the liquid fuel preparing means 37. The pump 56, motor 49 and fan 47 are thus all located within the mechanical compartment 24 which has inlet openings 62 and 63, to be later explained, for supplying air to the fan 47 for delivery to the air passages 46 and to the spaces to be heated.

The liquid fuel preparing apparatus 37 (Figs. 2, 3 and 4) includes a walled member 64 of substantially inverted L-shape, which is positioned vertically within the air supply chamber 31 with the short horizontal leg or outlet portion 38 thereof connected with the combustion chamber inlet 34. This horizontal portion of the walled or casing member 64 constitutes an air and fuel mixing chamber or portion 66 which will be later referred to. Located within the long vertical leg portion of the casing member 64 and in a spaced relation with the walls thereof is a heat conducting tubular member 67 having its upper end 68 open to the air and fuel mixing chamber 66, and its lower end 69 positioned against a plate 70 for closing the lower end of the casing 64 and the jacket member 39. This arrangement of the tube 67 provides two concentrically arranged chambers or spaces 71 and 72 within the vertical leg portion of the casing 64, with the inner chamber 72 being within the tube 67, and the outer chamber 71 being formed between the tube 67 and the wall of the casing 64.

The two chambers 71 and 72 are adapted to be heated by an electrical resistance element 73, illustrated as of coil type, which is supported in a spaced relation within the tube 67 and is substantially coextensive in length with the tube. The heat from the element 73 is radiated within the space 72 to heat the same, with a portion of this heat being radiated outwardly from the tube 67 for heating the space 71. Further heat is supplied to the space 71 by heat conducting and radiating portions 74 arranged in a spaced relation axially of the tube 67 and extended transversely of the chamber 71.

As illustrated in Fig. 4 the heat radiating and conducting portions comprise plate members of circular configuration stacked on the tube 67. Alternate plates 74 are formed adjacent their inner peripheries with angularly spaced perforations or openings 76 while the plates indicated as 74a and located between the plates 74 are formed with angularly spaced perforations 77 adjacent their outer peripheries.

The closing plate 70 at the bottom of the liquid fuel preparing apparatus 37 has apertures therein opposite the tube 67 to permit air from the air supply chamber 31 to pass upwardly within the tube 67 and about the heating coil 73, with the heated air passing outwardly from the tube 67 at its end 68 which is open to the air and fuel mixing chamber 66. The chamber or space 72 within the tube 67 thus constitutes an air heating portion.

The fuel injection nozzle 61 is mounted on the casing 64 in a position to introduce fuel into the outer chamber 71 and at a position near the top thereof. By virtue of the alternate arrangement of the perforated plates 74 and 74a the fuel thus introduced into the chamber 71 is permitted to move progressively over the plates 74 and 74a with the heat in these plates and radiated therefrom acting to heat the fuel to at least a vaporizing temperature. The chamber 71 thus constitutes a fuel heating portion or chamber which is closed at its lower end by the plate 70 and which is open at its upper end with the air and fuel mixing chamber 66. Thus as clearly appears in Fig. 4 the chambers 71 and 72 are closed to each other but are open at their upper corresponding ends with the air and fuel mixing chamber 66. The fuel introduced in the chamber 71 and the air admitted into the chamber 72 are thus heated separately but concurrently by the common heating coil 73. By virtue of the casing 64, tube 67 and plate portions 74 and 74a all being composed of a heat conducting material the heat from the coil 73 is readily transmitted to all portions of chambers 71 and 72 so that these chambers are always at substantially the same temperature.

In the operation of the liquid fuel preparing apparatus 37 the fuel delivered to the injection nozzle 61 by the pump 56 is introduced into the chamber 71 for passage downwardly over the plates 74 and 74a. The fuel within the chamber 71 is heated to a vaporizing temperature and rises upwardly into the air and fuel mixing chamber 66. The chamber 71 is of a length such that substantially all of the fuel introduced into the chamber 71 is vaporized, with any unvaporized fuel being collected at the bottom of the chamber 71 on the end plate 70. However, by virtue of the longitudinal spacing of the plates 74 and 74a over the complete length of the tube 67 and the equal heating of the plates by the heating coil 73 substantially all of the fuel introduced into the chamber 71 is vaporized before it reaches the bottom of the chamber 71. The air admitted into the tube 67 from the air supply chamber 31 moves upwardly within the tube by virtue of the pressure within the air supply chamber, which in one embodiment of the invention is about 2 inches of water, for passage outwardly from the top end 68 of the tube 67.

To facilitate the mixing of the heated air from the chamber 72 and the vaporized fuel from the chamber 71 there is provided at the top of these chambers a baffle screen 78 which is extended transversely across the casing 64 (Fig. 4). The screen 78 has a solid center portion 79 of a conical shape, with the apex of the portion 79 being extended downwardly into the tube 67 and cooperating with an outwardly flanged portion 81 at the top end 68 of the tube 67 to direct the heated air from the chamber 72 into the path or flow of the vaporized fuel passing from the chamber 71 into the air and fuel mixing chamber 66. The heated air and vaporized fuel thus travel together through the annular screen portion 82 of the baffle 78 for mixing together in the mixing chamber 66. The outlet 38 of the mixing chamber 66 is extended within the combustion chamber passage 32a and is provided with a perforated heat insulating plate 84 which functions to uniformly distribute the air and fuel mixture across the outlet 38 for passage into the combustion chamber. This vaporous air and fuel mixture is ignited for burning by ignition means 86 illustrated as being of usual spark plug type.

The operation of the heating unit 21 is best described in connection with the control circuit shown in Fig. 11. The control circuit includes the engine battery 19 which is connected by a power lead 88 with a main control switch 89 of single throw type including a terminal 91. The circuit for the heating coil 73 from the terminal 91 includes a conductor 92, a thermostatic switch 93, a conductor 94, the heating coil 73 and a ground connection 96; the thermostat 93 and the coil 73 being connected in series. The bimetal contact arm 97 and the contact arm 98 of the thermostatic switch 93 are normally closed. The switch 93 is mounted within the heater 21, as indicated at Fig. 2, and responsive in operation to the temperature of the heated air passing from the passages 46 to the outlet 52. The circuit for the pump 56 from the terminal 91 includes conductors 99 and 101, the breaker assembly 57, the pump 56 and a ground connection 102. The circuit for the motor 49 from the terminal 91 includes conductors 99 and 103, the motor 49 and a ground connection 104. By virtue of the contacts 97 and 98 of the thermostatic switch 93 being normally closed the coil 73, pump 56 and motor 49 are concurrently operated when the main switch 89 is closed. On heating of the thermostatic switch 93 to a temperature which corresponds substantially to a fuel vaporizing temperature of the liquid fuel preparing apparatus 37 the bimetal contact arm 97 moves away from the contact arm 98 to open the circuit of the coil 73.

In one embodiment of the invention the coil 73 develops a temperature of about 900° F. with an amperage drain on the battery of about 10 amperes. In this embodiment the motor 49 draws about 5 amperes while the pump 56 by virtue of its intermittent operation in response to the operation of the breaker assembly 57 operates with an average current drain of about one-tenth of an ampere. Thus when the coil 73 is operated the heater 21 has a total current demand on the battery 19 of about 15 amperes and when the thermostatic switch 93 opens the current demand of the heater is only about 5 amperes.

To aid the heating of the liquid fuel apparatus 37 by the coil 73 the exhaust gases from the combustion chamber 26 are passed through the jacket 39 in heat exchange relation with the casing 64. The heat from these exhaust gases is sufficient to heat the fuel in the chamber 71 to a vaporizing temperature independently of the coil 73 so that only a very infrequent operation of the coil 73, is required during normal heater operation. As a result the heater 21 requires a current demand of 15 amperes on the battery 19 for only short and infrequent periods. The heater 21 is thus able to be operated continuously and over long periods on the battery 19, when the effective capacity of the battery is at a reduced value due to cold temperatures.

From the above description it is seen that the heater 21 is adapted to be operated alone from the battery 19 when the effective capacity of the battery 19, is at a reduced value, and its operation is entirely independent of the engine 20. On operation of the heater 21, therefore, heated air may be carried to the battery 19 to increase its temperature and in turn its effective capacity to a value sufficient to turn over the engine 20 at a normal cranking speed. It is well known, of course, that the mechanical friction of an engine is appreciably increased with cold temperatures, and at temperatures of −20° F. and lower it has been found that the engine lubricating oil, even when a light oil is used, becomes so stiff as to provide improper lubrication after the engine is started. This increased mechanical friction increases the demand on the battery for starting so that if the mechanical friction is reduced a lower available energy of the battery can be used for engine starting. In other words a lower effective capacity of the battery will start the engine at a reduced mechanical friction than would be possible with the same effective capacity at an increased mechanical friction.

Further, as previously mentioned, in engines of Diesel type the usual fuel oil burned in these engines becomes thick at temperatures of −20° F. and lower so that it is difficult to move the fuel from a source of supply through the engine fuel feeding system, and to properly atomize the fuel by the usual fuel injecting process for proper burning in the engine. The heating system of this invention therefore, contemplates the heating of the battery 19, the heating of the engine fuel feeding system including the injecting means, and a source of fuel supply all in the manner now to be described.

With reference to Figs. 1 and 2 there are illustrated three fuel supply tanks, namely, a tank 106 carrying gasoline for operating the heater 21, and an auxiliary fuel tank 107 and a main fuel tank 108 which carry fuel oil of a kind used in the operation of the engine 20. Since gasoline remains practically unaffected by cold temperatures no provision is necessary for its being heated so that it may be used directly in operating the heater 21. As a result the heater 21 is capable of being operated without requiring any preheating of its fuel feeding system or source of fuel supply.

In order to accomplish a heating of the engine 20 and the engigne fuel feeding system, and the starting battery 19 the manifold 52 of the heater 21 is provided with a pair of discharge outlets 109 and 111. The outlet 111 is connected through a conduit 112 with the compartment 16 for the battery 19, a conduit 114 connecting the battery compartment 16 with the heater mechanical compartment 25 at the inlet 62 being used to return the air from the battery compartment to the heating chamber 46. The outlet 109 is connected by a conduit 116 with a shroud or housing member 117 which encloses a fuel pumping unit 118 for the engine 20. A fuel line 119 leading from a pump 121 of the pumping unit 118 to a corresponding fuel injecting unit 122 is enclosed within a conduit 123 connected at one end with the housing 117 to receive heated air therefrom, and open at its opposite end 124 to discharge heated air over the corresponding injector unit 122, and into the engine compartment 18.

It is contemplated that the engine compartment 18 be covered or otherwise substantially air sealed so that the heated air discharged from the conduits 123 is confined within the engine compartment 18 to heat the compartment and in turn the engine 20. The heated air supplied to the engine compartment 18 in this manner is returned to the heater 21 for reheating through a conduit 127 connecting the engine compartment 18 with the heater mechanical compartment 24 at the heater inlet 63. Closed heating systems are thus provided for both the battery 19 and the engine 20 so that the heat developed by the heater 21 is used to its fullest extent and in a most efficient manner for quickly increasing the temperature of the battery and the engine at cold temperatures.

Figure 7:
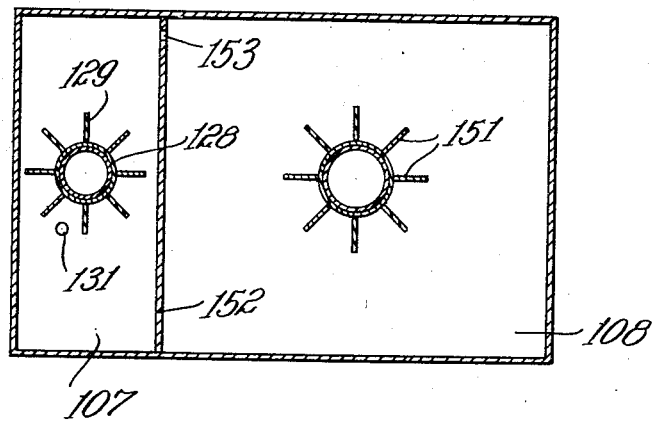
Fig. 7 is a sectional plan view taken approximately along the line 7—7 in Fig. 1 showing exhaust heat exchangers in the fuel supply for the engine of the mobile craft shown in Fig. 1.

Concurrently with the heating of the pumping unit 118, injecting units 122, the engine compartment 18, and the battery 19 there is accomplished a heating of the auxiliary fuel tank 107 by the exhaust gases discharged from the combustion chamber 26 of the heating unit 21. The tail pipe assembly 41 is connected with an exhaust pipe 128 which is extended within the auxiliary tank 107. As shown in Figs. 1 and 7 that portion of the exhaust pipe 128 within the tank 107 is provided with angularly spaced longitudinally extended heat radiating fin portions 129. A fuel line 131 connecting the auxiliary tank 107 with the engine pumping unit 118 has its inlet end 130 arranged adjacent the heat radiating fins 129 in the tank 107 so as to carry heated fuel to the engine 20. The fuel line 131, as is best shown in Fig. 1, is supported over one part in a heat exchange relation with the heater exhaust pipe 128, and with the heater housing 10, with a further part thereof being carried directly within the conduit 116 which carries heated air to the casing member 117. The fuel tank 107 and the fuel line 131 are thus completely heated prior to the operation of the engine 20 to provide for a free movement of the fuel therein.

On operation of the heater 21 for a period of time sufficient to heat the fuel in the tank 107, the fuel burned in the heater 21 may be changed from the gasoline in the tank 106 to the fuel oil in the tank 107 by manipulating a two-way valve member 132 connected at the junction of a fuel line 133 with a line 134 for feeding gasoline from the tank 106 to the heater pump 56. The fuel line 133 is connected with the tank 107 and is in a heat exchange relation over its entire length with the exhaust pipe 128, from the heater 21. The operation of the liquid fuel apparatus 37 is the same for preparing either gasoline or fuel oil for burning in the heater 21 so that the operation of the heater is uninterrupted by the supply of fuel oil thereto. By virtue of the operation of the heater 21 on either gasoline or fuel oil, gasoline may be used only for initially starting the heater while its continued operation may be accomplished by the use of fuel oil. After the heater 21 has been operated for a period of time sufficient to heat the battery 19 and the fuel supply and feeding system for the engine 20 to substantially normal operating conditions the engine 20 is started in the usual manner.

When the engine 20 is in operation the heat from the engine exhaust gases is used in heating the fuel in the main tank 108. The engine exhaust line 149 has a portion extended through the tank 108, which portion carries heat radiating fins 151 in a manner similar to the fins 121 previously described for the heater exhaust line 128. Further description of the fins 151, therefore, is believed to be unnecessary. The tanks 107 and 108 are separated from each other by a partition member 152 having opening 153 adjacent the bottom thereof for connecting the tanks 107 and 108 for a free flow of fuel therebetween (Fig. 1). Heated fuel, therefore, continues to be supplied to the engine 20 through the fuel line 131 during normal engine operation.

With the engine 20 in operation it is no longer necessary to heat the engine compartment 18 or the engine fuel feeding system so that the supply of heat from the heater 21 to these parts can be discontinued and supplied to the operator or passenger compartment 17. This is accomplished by a pivotal valve member 139 located in the outlet 109 and illustrated in detail in Fig. 5. The valve 139 is of a usual type adapted to control the flow of heated air through the conduit 116 and a conduit 141. Closing of the valve 139 shifts the flow of heated air from the conduit 116 to the conduit 141 which is connected with the outlet 109 and adapted to carry the heated air into a distributing box 140 carried on the fire wall 142 to the operator's side thereof. Heated air is also admitted into the compartment 17 from the battery compartment 16 through a valve controlled opening 143 in the compartment wall 115. A pivoted valve 144 for the opening 143 is pivotally movable to a closed position relative to the opening 143, as shown in full lines in Fig. 1, when only the battery 19 is being heated and to a second operating position, shown in dotted lines in Fig. 1 to close the conduit 114 when both the compartment 17 and battery are to be heated. Thus when the valve 144 is in its full line position a closed heating system is provided for the battery 19 and when the valve 144 is in its dotted line position the heated air from the heater 21, after being circulated about the battery 19, is discharged from the battery compartment 16 through the opening 143 into the operator's compartment 17. As a result the battery 19, concurrently with the heating of the operator's compartment 17, is retained at a temperature providing for an effective capacity capable of later starting the engine 20.

A closed heating system for the operator's compartment 17 is provided by the location of a flap valve 146 (Figs. 1 and 6) in the conduit 127 connecting the engine compartment 18 with the heater mechanical compartment 24. The valve 146 in its dotted line position shown in Fig. 6 closes an opening or outlet 147 connecting the conduit 127 with the operator's compartment 17. When the valve 146 is in its full line position shown in Fig. 6 the opening 147 is connected with the heater mechanical compartment 24. The heated air admitted into operator's compartment 17 from the opening 143 in the battery compartment wall 115 and from the air distributing box 140 is thus returned through the opening 147 to the heater 21 to be reheated for later discharge into compartment 17.

Figure 8:
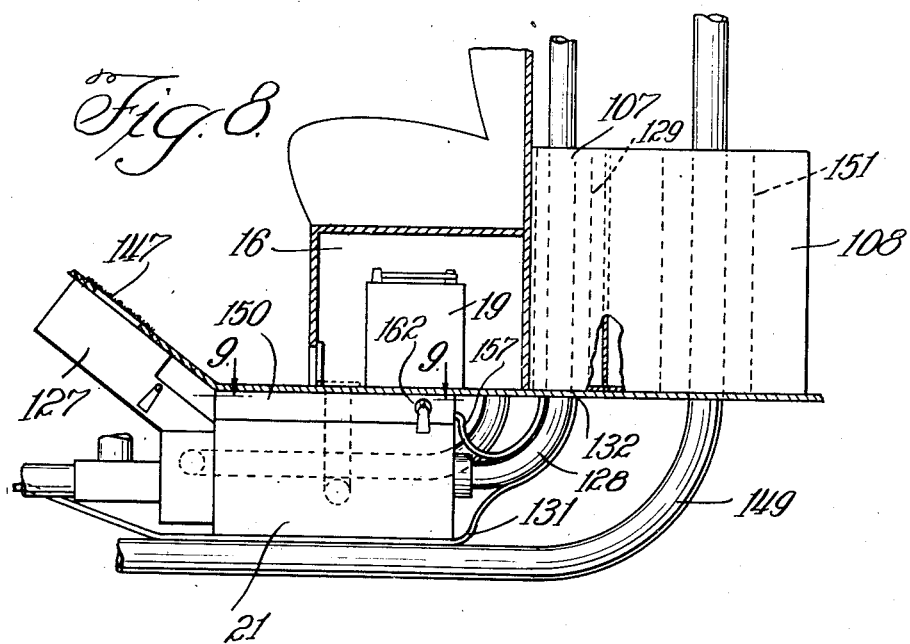
Fig. 8 is a fragmentary elevational view of a modified form of the invention.

The embodiment of the invention shown in Figs. 8, 9 and 10 is similar in all respects to the embodiment of Fig. 1 except for the provision of operation of the heater 21 entirely by the same fuel used in the operation of the engine 20. Similar numerals of reference, therefore, will be used to designate like parts.

With reference to Fig. 8 a tank 150 carrying fuel for the heater 21 is supported directly on the heater 21. Located within the tank 150 is the fuel pump 56 and an electrical heating element 155. The heating element 155 (Figs. 10 and 12) is connected in series with a second heating element 154 positioned in a heat exchange relation with the injector nozzle 61 and that portion of the fuel line 156, connecting the pump 56 with the injection nozzle 61, which is located outside of the tank 150. Prior to the operation of the heater 21 the resistance elements 155 and 154 are energized to heat the fuel in the tank 150, the fuel pump 56, and the fuel within the fuel line 156 and fuel injection nozzle 61. With the fuel feeding system for the heater 21 thus heated the heater is operated in all respects as was previously fully explained.

On operation of the heater 21 with the fuel within the tank 150 the heat within the auxiliary tank 107 is heated by the heat from the exhaust gases discharged from the heater through the exhaust pipe 128, which is extended through the tank 107. On heating of the fuel within the tank 107, heater operation is maintained by using the fuel in the tank 107 which is supplied to the pump 56 through the fuel line 157. As shown in Fig. 9 the fuel line 157 is connected with an inlet opening 158 of a two-way valve 159 which has a second inlet opening 161 opening directly into the tank 150. The openings 158 and 161, on manipulation of the valve 159 by an actuating knob 162, are alternately opened to the pump inlet 163. It is seen, therefore, that the capacity of the tank 150 may be relatively small, and in one embodiment of the invention is about one quart, so as to require a minimum of heating by the resistance element 155.

The control circuit for the embodiment of the invention in Fig. 8 is shown in Fig. 12. The circuit for the resistance elements 155 and 154 from the battery 19 includes a conductor 88', a main switch 89' adapted for closing with a terminal 166, a conductor 164, the resistance elements 155 and 154 and a ground connection 167. The switch 89' is also adapted to close with a terminal 165 which is connected with the terminal 91. The circuits for the heater coil 73, fuel pump 56 and motor 49 from the terminal 91 are the same in all respects as the like circuits in Fig. 11. The switch 89' is manipulated by the actuating knob 162 of the two-way valve 159. The valve stem 168 for moving the valve portions of the valve 159 is extended through the valve for carrying the switch 89', as shown in Fig. 9. On rotation of the actuating knob 162 in a clockwise direction, as viewed in Fig. 12, the circuit for the resistance elements 155 and 154 is initially closed. On operation of the heating elements 155 and 154 for a period of time sufficient to heat the fuel feeding system for the heater 21, and the fuel in the tank 150 the rotation of the knob 162 is continued in a clockwise direction, as also viewed in Fig. 12, to move the switch 89' out of contact with the terminal 166 and into contact with the terminal 165. This movement of the switch 89' deenergizes the elements 155 and 154 concurrently with the starting of the operation of the heater 21, the opening of the valve inlet 161 and the closing of the valve inlet 158 to supply fuel to the pump 56 from the tank 150. After the heater has been operated for a time sufficient for the exhaust gases therefrom to heat the fuel within the tank 107 the knob 162 is rotated further in a clockwise direction to move the switch 89' into contact with the terminal 91. This movement of the switch 89' continues the operation of the heater 21 but closes the inlet 61 and opens the inlet 158 to provide for the supply of fuel to the heater 21 from the tank 107. The remaining operation of the heating system shown in Fig. 8 is similar in all respects to that previously described in connection with the heating system of Fig. 1 so that a further description of such operation is thought to be unnecessary.

From a consideration of the above description, therefore, it is seen that the invention provides a heating system for facilitating the starting and operation of a Diesel engine, at cold temperatures, having a starting battery with a reduced effective capacity at such cold temperatures. The heating system is capable of being operated entirely independently of the Diesel engine and with a drain on the battery which provides for continuous heater operation over a prolonged period of time when the effective capacity of the battery is at a reduced value. Concurrently with the increase in the temperature of the engine battery to increase its effective capacity heat is also supplied to all portions of the engine fuel supply system to heat the fuel therein, while further heat is applied to heat the engine, so that starting of the engine takes place at a temperature corresponding substantially to a normal operating condition for the engine. A heater of combustion type, included as a part of the heating system of this invention, is adapted to be operated either on gasoline or on the same fuel used in the operation of the Diesel engine by virtue of an improved apparatus for preparing the gasoline or engine fuel for burning in the heater. The complete system is compact and simple in design, flexible in operation to provide for a complete heating of the engine and its associated parts as well as for supplying heat to the operator's compartment, and includes a minimum of parts requiring adjustment and servicing attention.

Although the invention has been described with reference to several preferred embodiments thereof it is to be understood that it is not to be so limited since modifications, and changes in the relative arrangement of the parts thereof can be made in a manner which is within the intended scope of this invention as defined by the appended claims.

I claim:

1. A heating system providing for the starting of a Diesel engine at cold temperatures having a starting battery with a reduced capacity at said cold temperatures, said system including a heater of combustion type using said battery as a sole source of power supply and operable entirely independently of operation of said engine, a fuel supply system for said engine including a fuel tank, fuel injecting means for said engine, fuel moving means operatively associated with the said fuel tank and said injecting means, means for carrying exhaust gases from said heater in a heat exchange relation with said tank, means for moving air in a heat exchange relation with said heater and the heated air to said battery, said fuel moving means and said fuel injecting means, said heater being operated, prior to the starting of said engine, to supply heated air to said battery to increase its effective capacity, and to said fuel moving means and said injecting means to heat the fuel therein, with the heat from said heater exhaust gases heating the fuel in said tank.

2. A heating system providing for the starting of a Diesel engine at cold temperatures having a starting battery for reduced effective capacity at said cold temperatures, said system including a liquid fuel burning heater of combustion type operable entirely independently of operation of said engine and having electrical portions using said battery as a sole source of power supply, means including one of said electrical portions for preparing said liquid fuel for burning in said heater, a fuel system for said engine including a pump and fuel injecting means, a fuel tank associated with said fuel system, a compartment for said engine, means operated from said battery for moving air in a heat exchange relation with said heater and the heated air to said battery, said fuel system and said engine compartment, and means for carrying exhaust gases from said heater in a heat exchange relation with said fuel tank, with said heater being operated prior to the operation of said engine to provide for the supply of heated air to said battery to increase its effective capacity, to said compartment to heat the engine therein and to said fuel system to heat the fuel therein, with the fuel in said tank being heated by the heat from said heater exhaust gases.

3. A heating system providing for the starting and operating of a Diesel engine at cold temperatures including a starting battery for said engine having a reduced effective capacity at said cold temperatures, a heater of combustion type using said battery as a sole source of power supply and operable from said battery at said reduced effective capacity, a fuel feeding system for said engine including a pump and fuel injector means, an auxiliary fuel supply for said engine, a main fuel supply for said engine, means for moving air in a heat exchange relation with said heating unit and the heated air to said fuel feeding system to heat the fuel therein, and to said battery to increase its temperature and in turn its effective capacity, means for carrying exhaust gases from said heating unit in a heat exchange relation with said auxiliary fuel supply, with said heater being operated prior to a starting of said engine to heat said battery, said fuel feeding system and said auxiliary fuel supply, with said engine being started with the fuel in said auxiliary fuel supply, and means for carrying exhaust gases from said engine in a heat exchange relation with said main fuel supply to heat the fuel therein for supply to said engine during normal operation.

4. A heating system providing for the starting and operating of a Diesel engine at cold temperatures having a starting battery for said engine with a reduced effective capacity at said cold temperatures, a heater of combustion type using said battery as a sole source of power supply and having electrical portions operable from said battery at said reduced effective capacity, a fuel feeding system for said heater including a source of fuel supply, a fuel feeding system for said engine, an auxiliary fuel supply for said engine, a main fuel supply for said engine, means including certain of said electrical portions for heating said fuel feeding system prior to the operation of said heater, means for carrying air in a heat exchange relation with said heater and the heated air to said battery and engine fuel feeding system, means for carrying exhaust gases from said heater in a heat exchange relation with said auxiliary fuel supply, with said heater being operated prior to said engine to heat said battery to increase its effective capacity, and said engine fuel feeding system and said auxiliary fuel supply to heat the fuel therein, and means, after said engine is started, for carrying exhaust gases from said engine in a heat exchange relation with said main fuel supply to provide for the supply of heated fuel to said engine during normal engine operation.

5. A heating system providing for the starting and operating of a Diesel engine, at cold temperatures, including a starting battery for said engine having a reduced effective capacity at said cold temperatures, a heater of combustion type using said battery as a sole source of power supply, a gasoline supply for said heater, an auxiliary fuel oil supply for said engine, a main fuel supply for said engine, a fuel supply system for said engine including said main and auxiliary tanks and fuel injectors, means for carrying exhaust gases from said heater in a heat exchange relation with said auxiliary tank, means for carrying exhaust gases from said engine in a heat exchange relation with said main tank, means for selectively supplying gasoline or fuel oil from said auxiliary tank to said heater, and means for moving air in a heat exchange relation with said heater and the heated air to said battery and injectors, with said heater and air moving means being initially operated on the gasoline from said gasoline tank to supply heated air to said battery, and to said injectors concurrently with the heating of said auxiliary tank by said heater exhaust gases, with the exhaust gases from said engine, after starting of said engine, heating said main tank for supplying fuel to said engine during normal engine operation.

6. In combination with a Diesel engine power plant which includes a fuel tank, fuel injecting means, fuel moving means for delivering fuel from said tank to said injecting means and an engine starting battery; internal combustion heating apparatus operable entirely independently of operation of said power plant and including means defining a combustion chamber, means energized solely from said battery for producing fuel combustion in said combustion chamber when said power plant is not in operation, and a recirculating conduit system having a portion arranged in heat exchange relationship with said combustion chamber and including conduits for conducting heated air from said apparatus to at least a portion of the named parts of said power plant and then back to said apparatus for reheating, thereby to facilitate starting of said power plant under low temperature conditions.

7. In combination with a Diesel engine power plant which includes a fuel tank, fuel injecting means, fuel moving means for delivering fuel from said tank to said injecting means and an engine starting battery; internal combustion heating apparatus operable entirely independently of operation of said power plant and including means defining a combustion chamber, means energized solely from said battery for producing fuel combustion in said combustion chamber when said power plant is not in operation, conduit means for conducting heated air from said apparatus to said fuel moving means, said fuel injecting means and said battery, and means for conducting the heated exhaust gases from said combustion chamber in heat exchange relationship with the fuel in said tank, thereby to facilitate starting of said power plant under low temperature conditions.

8. In combination with a power plant which includes a Diesel engine, a main fuel tank, an auxiliary fuel tank, fuel injecting means, fuel moving means for delivering fuel from either of said tanks to said injecting means, an engine starting battery, and means for selectively connecting said fuel moving means to said auxiliary and main fuel tanks; internal combustion heating apparatus including means defining a combustion chamber, means energized solely from said battery for producing and sustaining fuel combustion in said combustion chamber when said power plant is not in operation, a conduit system arranged in heat exchange relationship with said combustion chamber and including conduits for conducting heated air from said apparatus to said fuel moving means, said fuel injecting means and said battery, means for conducting the heated exhaust gases from said combustion chamber in heat exchange relationship with the fuel in said auxiliary tank, and means for conducting the exhaust gases from said engine in heat exchange relationship with the fuel in said main fuel tank.

HARRY B. HOLTHOUSE.